H. KOCH.
MECHANICAL MUSICAL INSTRUMENT.
APPLICATION FILED OCT. 16, 1905.
1,054,297.
Patented Feb. 25, 1913.
6 SHEETS—SHEET 5.
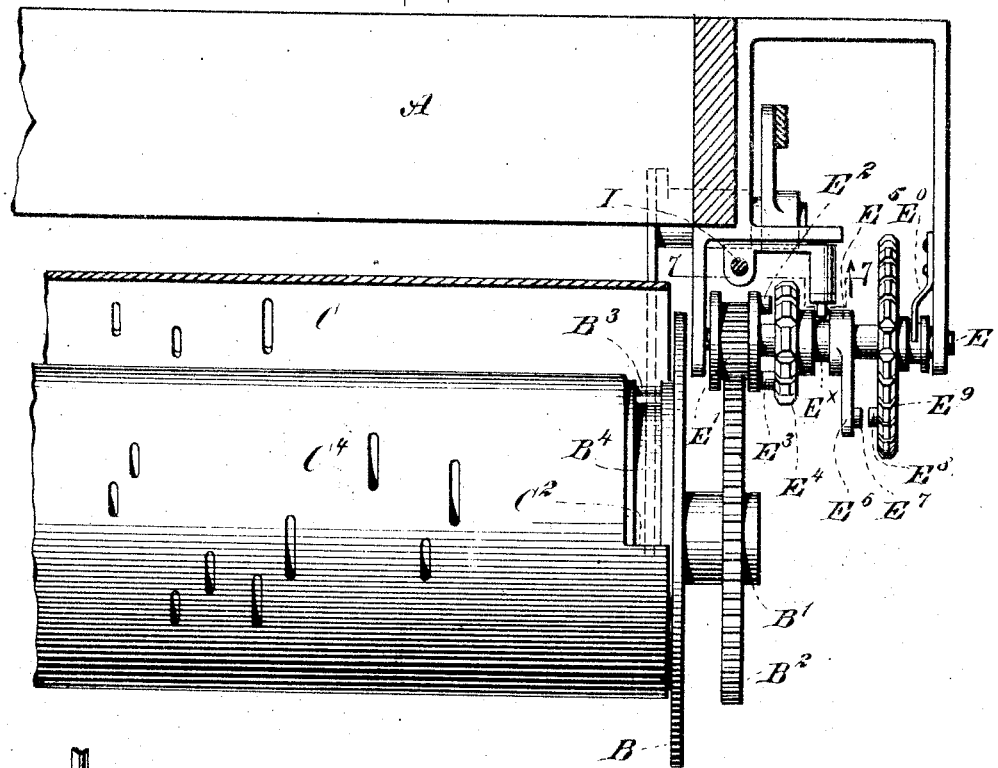
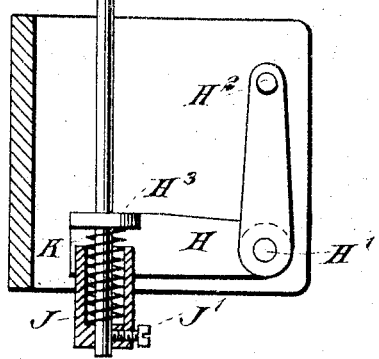
WITNESSES:
INVENTOR
Henry Koch
BY his ATTORNEYS

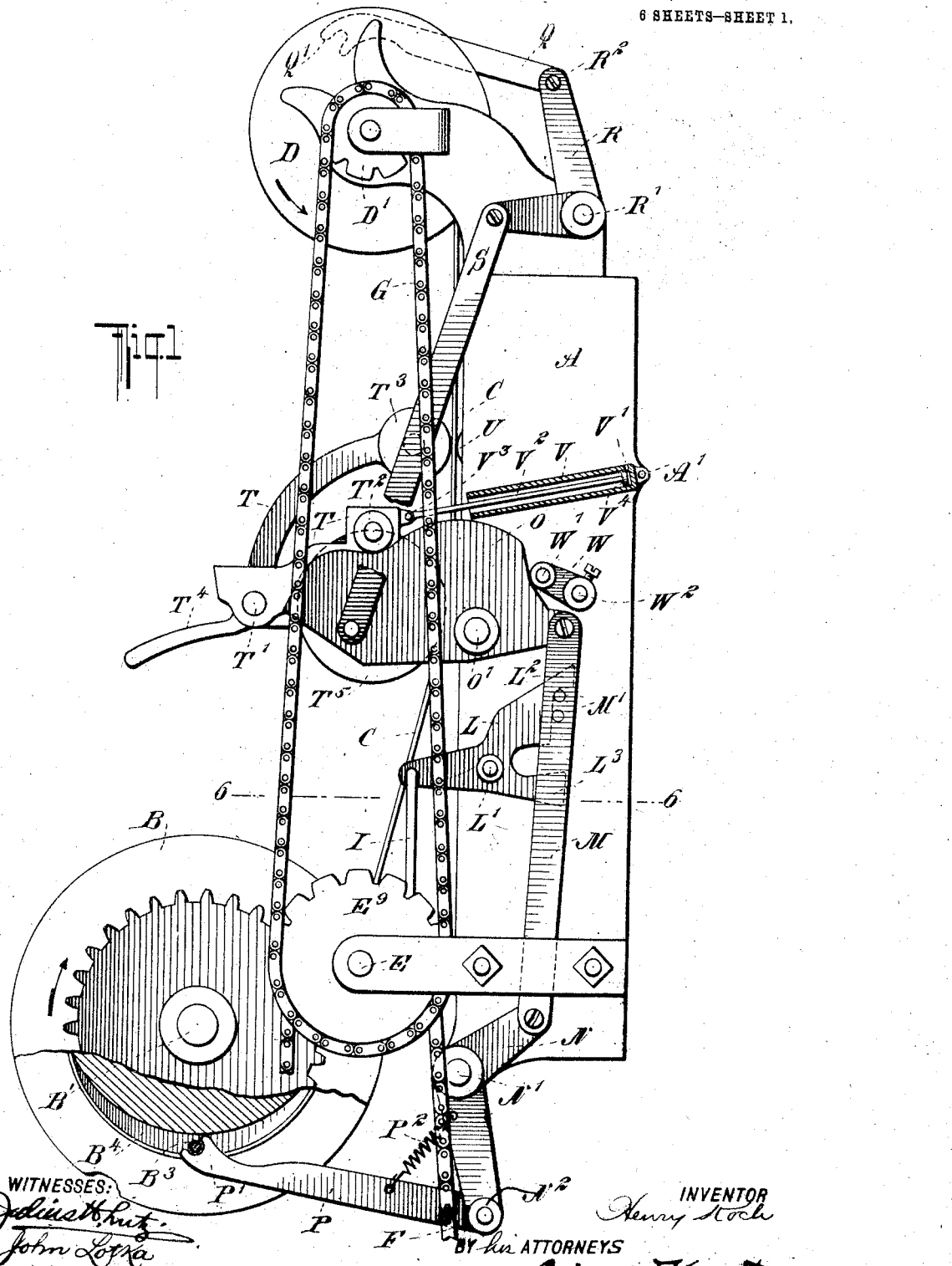

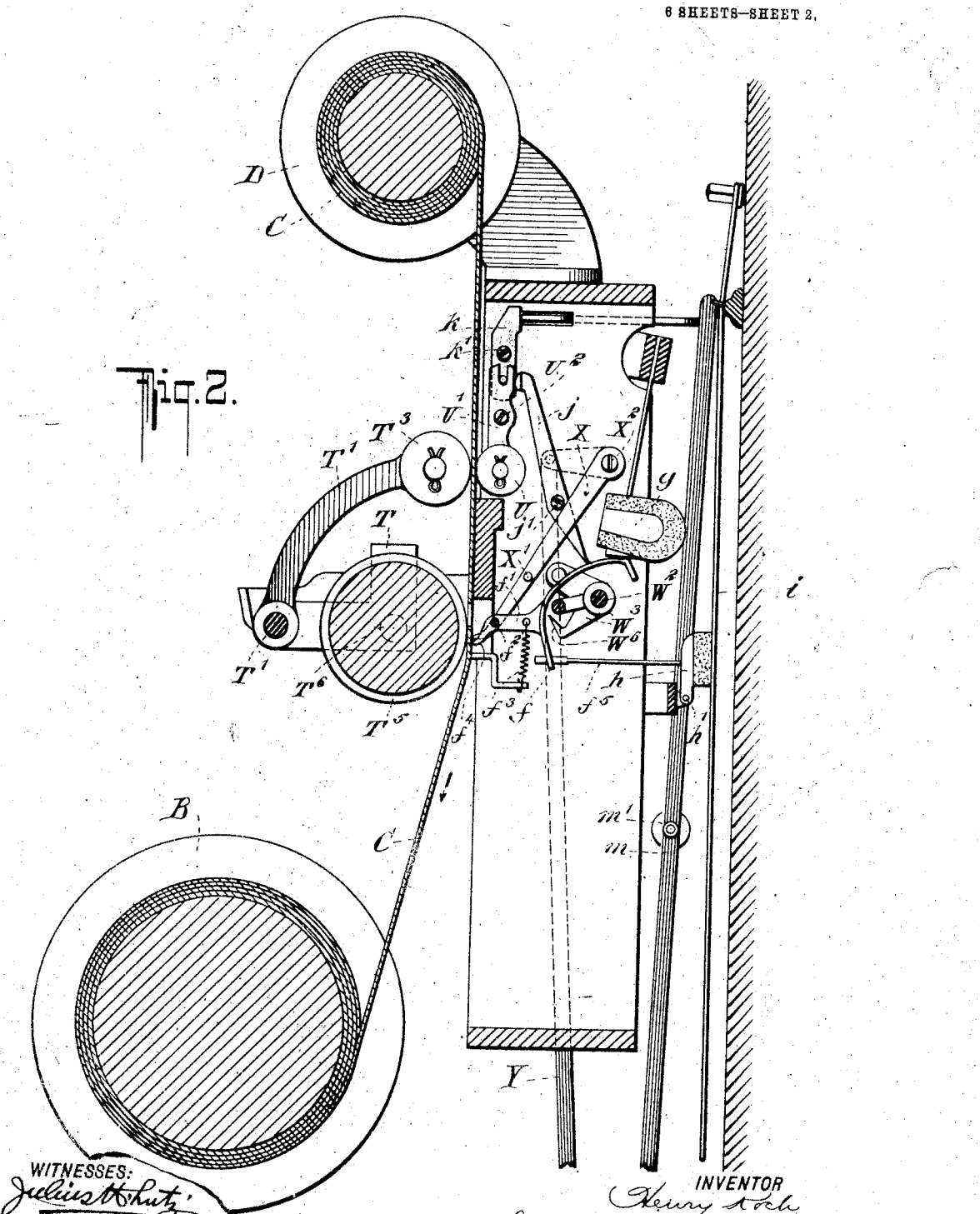

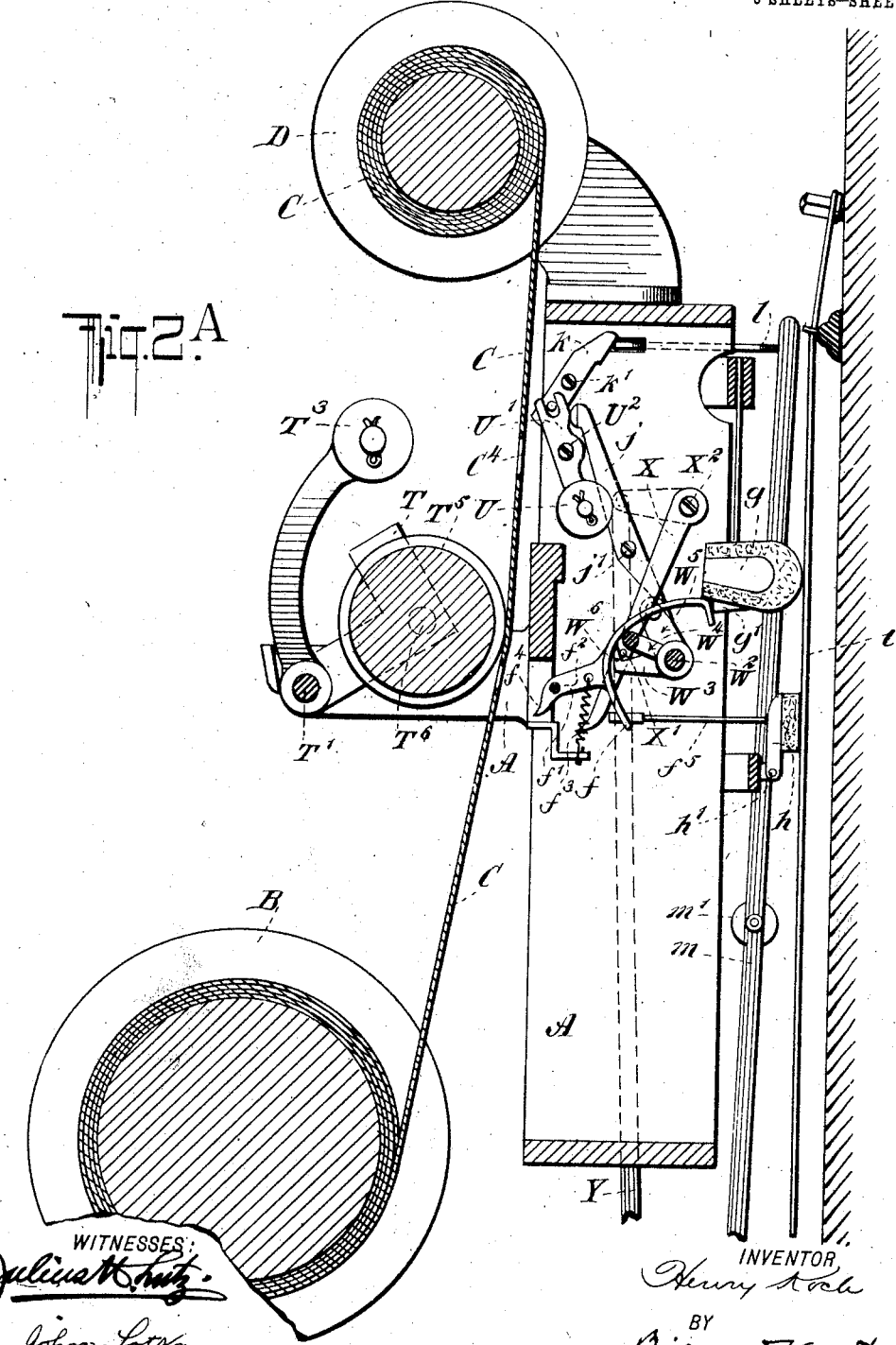

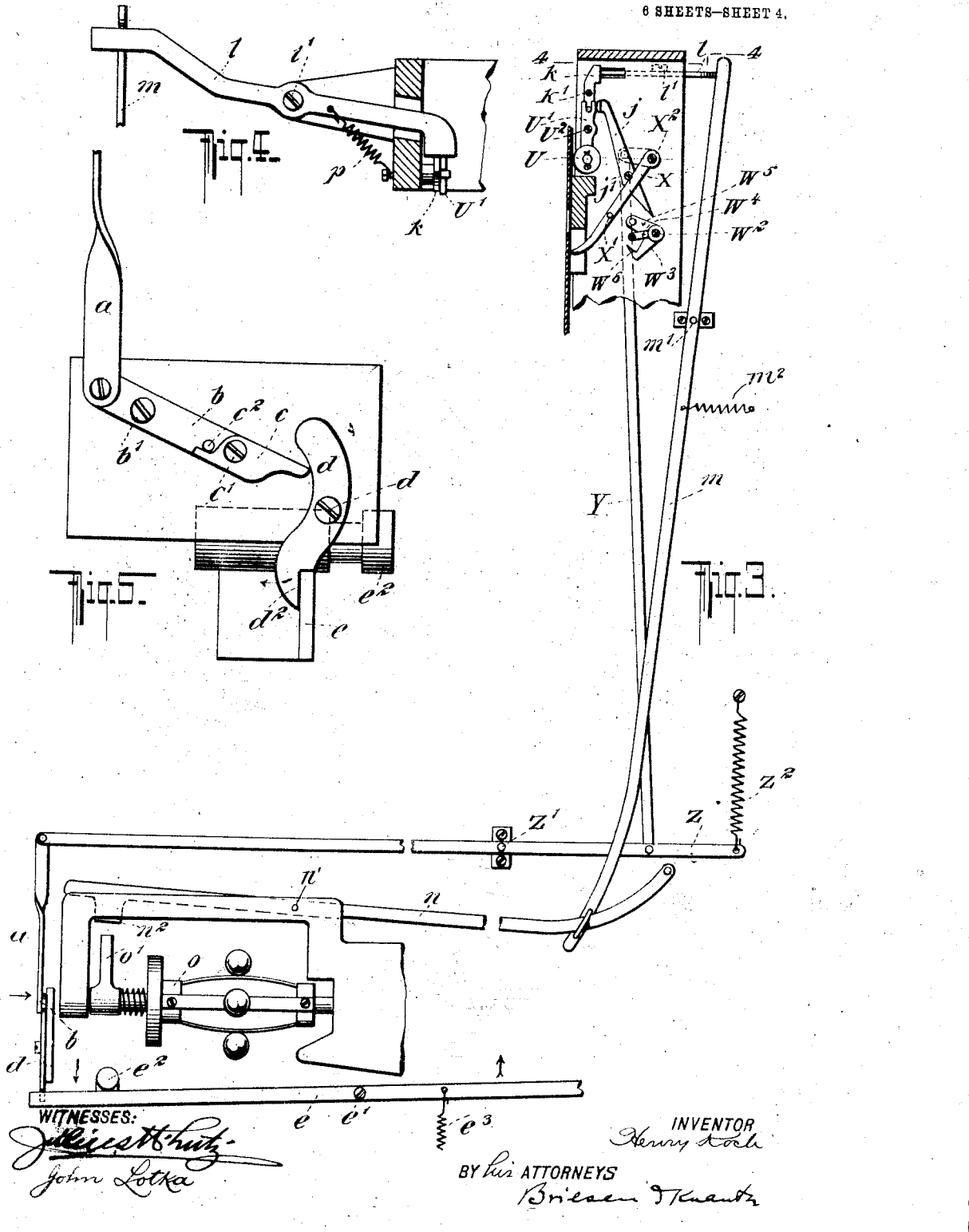

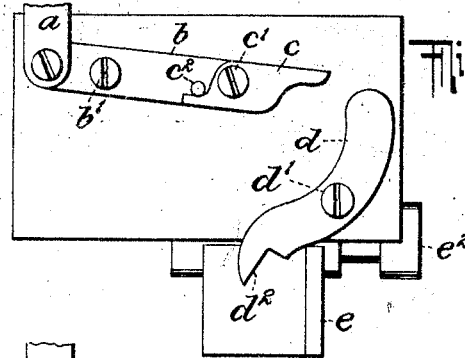
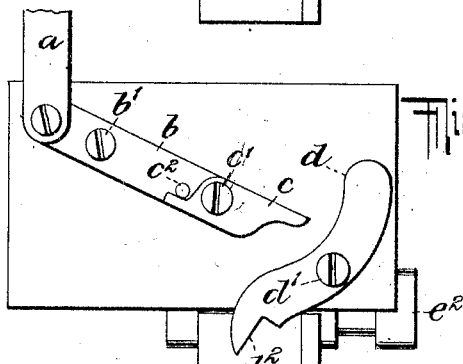
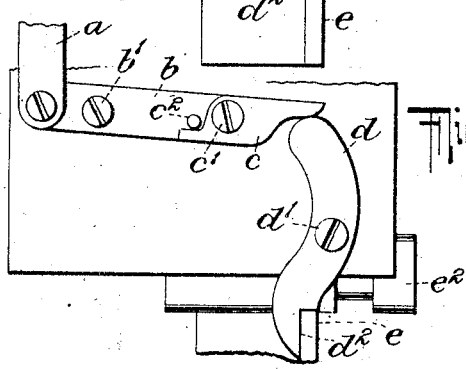
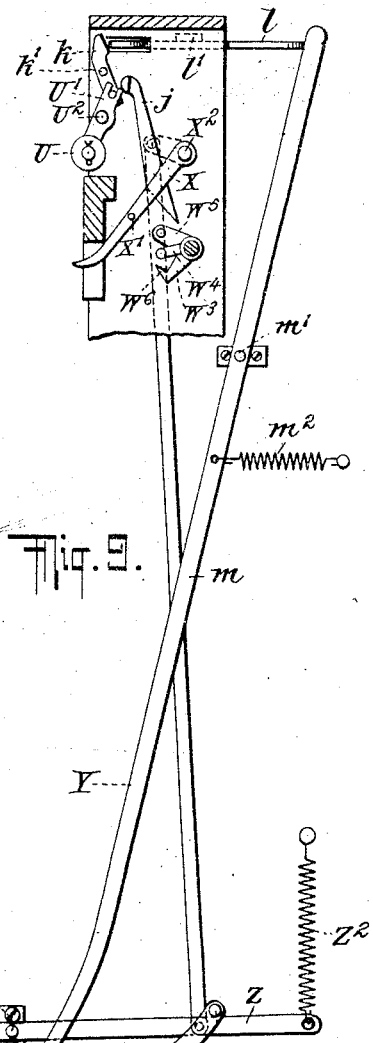
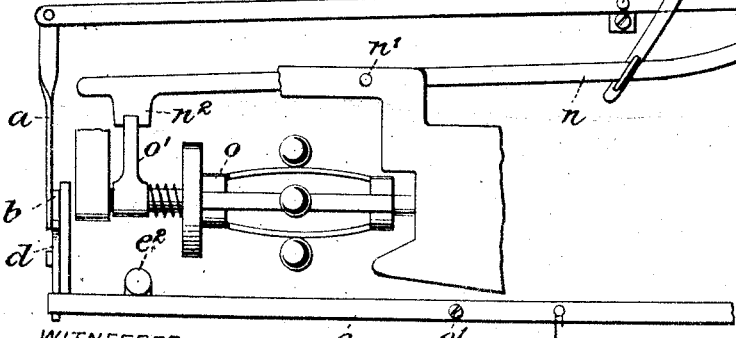

UNITED STATES PATENT OFFICE.

HENRY KOCH, OF RAHWAY, NEW JERSEY, ASSIGNOR TO THE REGINA COMPANY, OF RAHWAY, NEW JERSEY, A CORPORATION OF NEW JERSEY.

MECHANICAL MUSICAL INSTRUMENT.

1,054,297.   Specification of Letters Patent.   Patented Feb. 25, 1913.

Application filed October 16, 1905. Serial No. 282,982.

*To all whom it may concern:*

Be it known that I, HENRY KOCH, a citizen of the United States, and resident of Rahway, Union county, New Jersey, have invented certain new and useful Improvements in Mechanical Musical Instruments, of which the following is a specification.

My invention relates to mechanical musical instruments and particularly to such as are controlled by a flexible music sheet or note sheet which passes from one roller to another during the playing of the instrument and then is rewound or re-rolled in the opposite direction after the piece has been played.

The invention will be fully described hereinafter, and the features of novelty pointed out in the appended claims.

Reference is to be had to the accompanying drawings, in which—

Figure 1 is a side elevation of that portion of a mechanically played stringed instrument, to which my invention is applied, with the parts in the position they occupy during the playing of the instrument; Fig. 2 is a sectional elevation illustrating the parts in substantially the same position; Fig. 2$^A$ is a section taken in the same plane as Fig. 2, but showing the parts in the position they take during the re-rolling operation; Fig. 3 is an elevation, with parts in section, showing the connection of certain parts represented in Figs. 1, 2 and 2$^A$, with the starting and stopping mechanism; Fig. 4 is a sectional plan view on line 4—4 of Fig. 3; Fig. 5 is a detail elevation looking in the direction of the arrow in Fig. 3; Fig. 6 is a horizontal section substantially on line 6—6 of Fig. 4; Fig. 7 is a detail sectional elevation on line 7—7 of Fig. 6; Fig. 8 is a partial face view of the note sheet; Fig. 9 is a view similar to Fig. 3 showing the parts in a different position. Figs. 10, 11 and 12 are views similar to Fig. 5 illustrating the parts in various positions.

A (Figs. 1 and 6) designates a part of the instrument frame for supporting the various movable parts, among which is the lower roller B receiving the note sheet C as it unwinds from the upper roller D during the playing of the instrument. The manner of securing the sheet to the lower roller may be the usual one, by means of an eye C′ adapted to hook on a pin (not shown).

Upon the shaft B′ of the lower roller is secured a gear wheel B$^2$ meshing with a pinion E′ mounted on a shaft E. The pinion E′ has a clutch finger E$^2$ adapted for engagement by a similar finger E$^3$ on the driving wheel E$^4$ which receives its motion, as by a chain F, from any suitable device, such as the electric or spring motor (not shown) commonly employed to drive the note sheet. The drive wheel E$^4$ is attached to a sleeve E$^5$ capable of sliding lengthwise of the shaft E, and with the said sleeve is connected an arm E$^6$ having a clutch finger E$^7$ adapted to engage a similar finger E$^8$ on a chain wheel E$^9$ held against longitudinal movement, as by an arm E$^0$. One of the three wheels E′, E$^4$, E$^9$ may be held to rotate with the shaft E, the others being loose thereon, or all three wheels may be loosely mounted on the shaft which in that case would be more properly termed an axle.

During the playing of the music, the drive wheel E$^4$ is in the position shown in Fig. 6, so as to rotate the lower roller B in the direction indicated by the arrow in Fig. 1. If the wheel E$^4$ be shifted to the right, it will drive the upper roller D, through the medium of the chain wheels E$^9$ and D′ and the chain G, in the direction indicated by the arrow in Fig. 1.

In order to shift the drive wheel E$^4$, I provide a lever H fulcrumed at H′ and having a pin H$^2$ projecting into a groove E$^x$ of the sleeve E$^5$. Through a lug H$^3$ of the lever H extends a rod I to which a cup J is secured by means of a set screw J′, a spring K being interposed between said cup and the lug H$^3$. The upper end of the rod I is connected with a lever L fulcrumed at L′ and held (during the playing of the instrument) in the position shown in Fig. 1, by a pin or two pins M′ on a connecting bar M, said pins being between two projections or hooks L$^2$, L$^3$ of the lever L.

The connecting bar M is pivotally attached at one end to an elbow lever N, fulcrumed at N′, and at the other end to a cam O, fulcrumed at O′ and controlling various parts of the mechanism as will be described hereinafter. The elbow lever N is pivotally connected at N$^2$ with an arm P having a forked end P′ adapted to engage a pin B$^3$ located in a recess B$^4$ of the lower roller B. A similar construction is provided at the upper roller D, and it has been deemed unnecessary to repeat the showing there in full, Fig. 1 simply indicating the arm Q having a forked end Q' and pivoted at R² to an elbow lever R fulcrumed at R'. A connecting bar S extends from the lever R to the cam O. A spring P² connects the arm P with the elbow lever N and has a tendency to pull said arm upward into the recess B⁴; normally, however, the sheet C is in the path of the end P' so as to keep it outside the recess B⁴, and similarly the end Q' is normally kept by the sheet C from dropping into the recess of the upper roller D. A spring corresponding to P² is not required for the upper arm Q, as its weight will suffice to make it enter the recess of the roller D at the proper time. In order to allow of this inward movement of the arms P and Q, the sheet C is provided near each end, along one edge, with a cut-out portion C², it being understood that the ends P', Q' of said arms are in planes corresponding to the location of said cut-out portions C².

The cam O engages a roller T² carried by the note holder T, fulcrumed at T', and provided with a roller T³ adapted to engage the note sheet C at the same point where said sheet is engaged, on the opposite side, by a roller U, to be referred to hereinafter. The note holder T normally rests on the cam O by gravity, but may be swung out of the way, if desired, by means of the handle T⁴. The note holder further carries a roller T⁵, journaled at T⁶. In order to prevent noise and jars upon the downward movement of the note holder, I provide the dash-pot arrangement shown in Fig. 1, where a cylinder V having a vent V' is pivoted to the frame at A' while a piston rod V² is pivoted to the note holder at V³ and secured to the piston V⁴ at the other end.

Another portion of the cam O engages a roller W' at the end of an arm W secured to a shaft W². This shaft also carries rigidly three arms W³, W⁴, W⁵, the functions of which will be described presently. One of these arms W³, has a hook W⁶ adapted to engage a pin X' upon an elbow lever X fulcrumed at X². The said lever is pivotally connected with a rod Y, having a like connection with a lever Z, fulcrumed at Z' and pushing the rod Y upward under the influence of a spring Z². On the other side of its fulcrum, the lever Z is connected by a rod $a$ with a lever $b$ fulcrumed at $b'$. To this lever is pivoted at $c'$ a finger $c$, the movement of which is limited by a pin $c²$ on the lever. The finger $c$ is engaged by a locking lever $d$ fulcrumed at $d'$ and having a notch $d²$ for the reception of the end of a starting lever $e$, fulcrumed at $e'$ and provided with a lug $e²$ the purpose of which will be described hereinafter. The starting lever may be operated directly by hand, may be coin-controlled. The end of the lever X is adapted to drop into one or more openings C³ arranged in the note sheet at places corresponding to the end of a piece.

The second arm W⁴ is adapted to engage an elastic member $f$ secured to a lever $f'$ fulcrumed at $f²$ and pressed downward by a spring $f³$. The end or heel $f⁴$ of this lever is thus forced against the note sheet C, which is provided with the usual openings C⁴ in the path of the several heels $f⁴$ (see Fig. 2). The end of the elastic member $f$ is adapted to lock the hammer $g$ against vibration by engaging a shoulder $g'$ thereon, (see Fig. 2ᴬ), the said hammer being mounted on a support which is constantly vibrated by suitable mechanism. The said member $f$ is also connected by a rod $f⁵$, with the damper $h$, fulcrumed at $h'$. It will be understood that each string has its own damper, hammer, lever $f'$ and connected parts. The arrangement of strings $i$, hammers $g$, dampers $h$, and in general the sound-producing mechanism proper, forms no part of the invention claimed in this application.

The third arm, W⁵, is adapted to engage a lever $j$, fulcrumed at $j'$, and engaging the lever U' which carries the roller U. The lever U', fulcrumed at U², is connected with another lever $k$, fulcrumed at $k'$, and arranged to push against a lever $l$, fulcrumed at $l'$. In its turn, the lever $l$ engages a lever $m$, fulcrumed at $m'$, and operatively connected with the stop lever $n$, fulcrumed at $n'$, and having a lug $n²$ adapted to be projected into the path of an arm $o'$ on the shaft of the governor $o$. A spring $p$ is attached to the lever $l$ to press the levers U' and $k$ against the end of the lever $j$.

A spring $m²$ keeps the upper end of the lever $m$ against the lever $l$, but should be weaker than the spring $p$. The normal position of the parts, that is the position of rest, shown in Figs. 9 and 10, before any music sheet has been inserted is as follows: The arm T and parts connected therewith are in the raised position (Fig. 2ᴬ) or in the lowered position (Fig. 2); the roller U is in a position farther toward the left than shown in Fig. 2, or in other words, is in the position shown in Fig. 9 and the lower end of the lever $m$ is to the left of the position shown in Fig. 3 so that the lug $n²$ is in the path of the governor arm $o'$ as clearly shown in Fig. 9; the motor therefore cannot be started. The cam O is raised on the right-hand side of its pivot O', being therefore in the position of Fig. 1, and the arms W³, W⁴ and W⁵ are in their lower positions shown in Fig. 2. The lever X is raised at its lower end under the influence of the spring Z² so that the left-hand end of lever Z stands lower than in Fig. 3 causing the right-hand of lever $b$ to stand higher than in Fig. 5, or in other words in the position shown in Fig. 10. The locking lever $d$ is in the releasing position shown in Fig. 10 (that is the notched end $d^2$ is swung to the left from the position Fig. 5) and the lever $e$ being thus released is in its locking position with the lug $e^2$ in the path of the governor arm $o'$. The arm T is lifted (this position of the arm being shown in Fig. $2^A$) to facilitate the insertion of the sheet C, if the arm does not stand so already, and the sheet is fastened to the lower roll and the arm T is lowered, the parts thus reaching the position shown in Fig. 1. This bringing of the sheet into position throws the roller U and the lever X to the right, to the position shown in Fig. 2. This movement of the roller U through the lever $k$ moves the lever $l$ on its pivot, thus moving the one end of the said lever $l$ in the direction away from the lever $m$. Under the influence of the spring $m^2$ the lower end of the lever $m$ is moved from the position shown in Fig. 9 to the position shown in Fig. 3, causing the lever $n$ to be swung on its pivot so as to raise the lug $n^2$ and remove it from the path of the governor arm $o'$; the lug $e^2$, however, remains in the path of the said arm so that the motor will not start at once upon the introduction of a sheet. The movement of the lever X, upon the aforesaid insertion of the sheet, causes the right-hand end of the lever $b$ to be lowered to the position shown in Fig. 11, the lever $d$ however, remaining in its releasing position as shown in said Fig. 11. To start the operation the lever $e$ is swung in the direction of the arrow in Figs. 3 and 9, thus causing the lug $e^2$ to move out of the path of the arm $o'$ and releasing the governor and with it the motor, which is of any suitable kind. The chain F will drive the lower roller B through the gearing E', $B^2$, in the direction indicated by the arrow in Fig. 1, and the note sheet C will be wound on said roller, and unwound from the upper roller D. As soon as the lever $e$ has been swung away from the arm $o'$ (while the lever $b$ is in the lowered position shown in Fig. 5) the weight of the lever $d$ causes it to swing to its locking position, the parts then having the position shown in Fig. 5.

It will be seen that during the playing of the piece (see Fig. 2), the hammers $g$ are held against vibration, by the elastic member $f$, and the dampers $h$ are against the strings $i$, as long as the heels $f^4$ bear against the sheet C; when, however, any heel drops into one of the openings—$C^4$ of the sheet, the corresponding hammer is entirely released, and the respective damper swung off the string. As soon as the heel $f^4$ clears the opening $C^4$, the parts resume the position shown in Fig. 2. As soon as the cut-out portion $C^2$ of the music sheet gets past the end P' of the arm P, the sheet will raise said end out of the recess $B^4$, and in the further operation the end P' will rest on the outer surface of the sheet. This explanation fully describes the condition of the parts during the playing of the instrument. At the end of a piece (and in some cases there are several pieces on the same note sheet C), the end of the lever X will drop into the opening $C^3$ of the note sheet, and this will cause the lever $b$ to move upward at the right hand end, thus swinging the locking lever $d$ to release the starting lever $e$ as indicated by the arrow in Fig. 5. The latter, under the influence of its spring $e^3$, or other means having a tendency to throw the lug $e^2$ of said lever toward the governor arm $o'$, swings to the position in which the lug $e^2$ is in the path of the arm $o'$, and the instrument is thus stopped. A new operation of the instrument, for playing the next piece on the sheet, is started by again swinging the lever $e$ in the direction of the arrow.

When the note sheet has almost fully unwound from the upper roll D, the forked end Q' of the arm Q will drop into the cut-out portion $C^2$ at that end of the sheet, and into the recess of the upper roll (corresponding to the recess $B^4$) and will be engaged by a pin corresponding to $B^3$ because in playing the upper roll then turns in a direction opposite to that indicated by the arrow in Fig. 1. This will exert a thrust on the arm Q in such a manner as to move the cam O downward (at its right hand portion), and such movement will perform simultaneously the following operations.

First, the arm $W^5$ of the shaft $W^2$ (which shaft is rocked by the roller W') will be lifted to bring its pin in engagement with the lever $j$, thus swinging said lever $j$ on its pivot and causing its upper end to push the levers U' and $k$ into the position shown in Fig. $2^A$, at the same time the lever $j$ is locked by said pin. The upper end of the lever $k$ will thus swing the lever $l$ against the tension of the spring $p$. Under the influence of the spring $m^2$ the lever $m$ will follow the movement of the lever $l$, but this slight movement of the lever $m$ will only move the lug $m^2$ farther from the path of the governor arm $o'$.

Second, the note holder T will be brought to the position shown in Fig. $2^A$, thus allowing the portion of the sheet C between the rollers B, D to move slightly forward as shown. If the roller U were free, it would follow the sheet in this forward movement and would stop the motor by bringing the lug $n^2$ into the path of the governor arm $o'$; the forward movement of the roller U is, however, prevented by the locking of the lever $j$ as above described.

Third, the arm $W^4$ swings the elastic members $f$ upward and thus locks the hammers $g$ and dampers $h$, or, in other words, renders the sound-producing devices inactive.

Fourth, the arm W³, with its hook W⁶, engages the pin X' of the lever X, swings said lever slightly rearward, and locks it in the rear position.

As the shifting movement of the cam O nears its end, the lower pin M' will engage the hook L³ and swing the lever L to lift the rod I. This movement will first compress the spring K and as soon as the spring acquires a sufficient tension, it will quickly throw the lever H, and with it the clutch sleeve E⁵, to their other or reversing position. If the spring K were omitted, the operation would not be so reliable, as it might happen that the clutch sections E², E³ would be disengaged and the clutch sleeve come to a stop before the clutch sections E⁷, E⁸ would come into operative relation. As soon as the clutch sleeve has been shifted, the upper roller D will be driven by the chain G, the lower roller B turning simply by the pull of the sheet C which now winds on the upper roller. When the sheet is almost unwound from the lower roller B, the forked end P' of the lever P will register with the corresponding cut-out portion C² of the sheet C, and will thus be allowed to swing into the recess B⁴. As the roller B is now rotating in the direction opposite to that indicated by the arrow in Fig. 1, the pin B³ will exert a thrust on the arm P and will thus swing the cam O back to its original position. All the parts controlled directly by the cam will thus resume the positions shown in Fig. 2. Toward the end of the cam's movement, the upper pin M' will engage the hook L² and thus shift the clutch sleeve E⁴ back to the position shown in Fig. 6. One of the openings C³ is so arranged as to register with the end of the lever X at this time, and through the mechanism hereinbefore described, the starting lever e will be allowed to arrest the motor by contact of the lug c² with the governor arm b'. The instrument will then be ready to play again as soon as the starting lever e is operated to release the motor.

It will be observed that the shifting mechanism proper, which transfers the driving action from one of the rollers B, D, to the other, is not operated until after the position of all the other parts has been changed, thus insuring a reliable operation. This successive action is obtained by the loose or independent movement due to the space left between the hooks L², L³ and the pins M'.

The roller U will also move forward in case the note holder T should accidentally be thrown into the position shown in Fig. 2ᴬ, during the playing of the instrument. Such forward movement of the roller U will cause the lug u² to stop the motor by engaging the arm b'.

The position of the parts shown in Fig. 12 is an accidental one, brought about by the manual movement of the lever e in a direction to remove the lug c² from the path of the governor arm b'. This position occurs only when this operation of the lever e takes place before a sheet has been inserted in position. To prevent this accidental movement of the lever e from locking the parts against further operation, the pivoted dog c is provided, so that as the sheet is inserted in position and the parts are operated as hereinbefore described, this dog c will be free to swing on its pivot c' so as to pass the locking lever d into the position shown in Fig. 5. The movement of the dog c in the opposite direction, is prevented by the pin c².

I claim as my invention:

1. In a mechanical musical instrument, the combination of a note sheet, two rolls to which the respective ends of the sheet are secured, mechanism for driving either one of said rolls, and means, controlled by the end portions of the sheet, for making said rolls serve alternately as winding or driving rolls, said means comprising a rod and a spring connected with said rod to insure a quick change from one roll to the other.

2. In a mechanical musical instrument, the combination of a note sheet having cut-out portions, two rolls to which the respective ends of the sheet are secured, each roll having a recess arranged to register with said cut-out portion of the sheet, arms the ends of which are adapted to ride on the sheet and to drop into said recesses for operative connection with said rollers, a driving mechanism, stop mechanism under the control of said arms, and shifting mechanism connected with the stop mechanism and movable relatively thereto so that said shifting mechanism and said stop mechanism will be operated successively, said shifting mechanism operating to connect one roll or the other with said driving mechanism.

3. In a mechanical musical instrument, the combination of two rollers, a note sheet having its respective ends secured to said rollers and arranged to travel from one to the other, mechanism for reversing the direction of the sheet's movement, and a note sheet holder arranged to engage said note sheet and operatively connected with said mechanism.

4. In a mechanical musical instrument, the combination of a note sheet, two rollers to which the respective ends of the sheet are secured, mechanism controlled by the ends of the sheet for reversing the direction of the sheet's travel, a stop mechanism for said rollers, sound producing devices, a locking mechanism operatively connected with the reversing mechanism for holding the sound producing devices in an inactive position, and means operatively connected with the reversing device for throwing said stop mechanism out of action.

5. In a mechanical musical instrument, the combination of a note sheet, two rollers to which the respective ends of the sheet are secured, means for moving the portion of the sheet which is between the rollers transversely of its path of travel, mechanism for reversing the direction of the sheet's travel, stop mechanism having an operating portion arranged to engage said sheet and movable transversely therewith, and means, controlled by the reversing mechanism, for alternately locking said stop mechanism against movement and for releasing said stop mechanism.

6. In a mechanical musical instrument, the combination of a note sheet, two rollers to which the respective ends of said note sheet are secured, a driving device, a reversing device for connecting said driving device with said rollers alternately, sound-producing devices, a movable note sheet holder, a stop device movable into and out of operative position by said sheet in its longitudinal movement, another stop device controlled by a movement of the sheet transversely to the plane of its traveling portion, a rock shaft having means for controlling the operation of the sound-producing devices and the two stop devices, a cam controlling the position of said rock shaft and said note sheet holder, means controlled by the end portions of the sheet, for shifting said cam, and an operating connection from the cam to the reversing device, said connection comprising loose parts so that the cam may move part of the distance without affecting the reversing device.

7. In a mechanical musical instrument; the combination of a note sheet, rollers on which it is adapted to wind alternately, means for reversing the direction of the note sheet's travel, a movable sheet holder arranged to engage said note sheet during the playing of a selection and operated by said reversing means, and a dash-pot for insuring a smooth and noiseless movement of the note sheet holder.

8. In a mechanical musical instrument; the combination of a note sheet, rollers on which it is adapted to wind alternately, means for reversing the direction of the note sheet's travel, a movable sheet holder arranged to engage said note sheet during the playing of a selection and operated by said reversing means, and a yielding check for insuring a smooth and noiseless movement of the note sheet holder.

9. In a mechanical musical instrument, the combination of a note sheet, rollers on which it is adapted to wind alternately, a driving mechanism and mechanism for connecting it alternately with said rollers, a movable note sheet holder arranged to engage the note sheet on one side, a roller arranged to bear against the opposite side of the note sheet in registry with said note sheet holder, a stop mechanism controlled by the movement of the last named roller, and means, controlled by the mechanism which connects the driving mechanism with one winding roller or the other, for rendering said stop mechanism inactive.

10. In a mechanical musical instrument, the combination of a note sheet, two rollers to which the respective ends of the sheet are secured, stop mechanism movable to an inoperative position by the sheet when the latter is being moved into the playing position, mechanism for reversing the direction of the sheet's travel, means arranged to move the sheet transversely of its direction of travel prior to its return or re-rolling, and means for maintaining the stop mechanism in an inactive position during such transverse movement of the note sheet.

11. In a mechanical musical instrument the combination of the note sheet, two rolls to which the respective ends of the sheet are secured, a driving mechanism, reversing means for connecting said driving mechanism with the rollers alternately, said reversing means being maintained in an inoperative position by said note sheet and stop mechanism moved to an inoperative position by the sheet and adapted to become operative at the end of the return or re-rolling of the sheet.

12. In a musical instrument, the combination of the note sheet, two rollers to which the respective ends of the sheet are secured, a driving mechanism, reversing means for connecting said driving mechanism with the rollers alternately, said reversing means being controlled by the note sheet, vibrating sound producing devices, means operated by the sheet during its travel while in its playing position for holding said sound producing devices against vibration, and releasing them for operation when required, mechanism operated by the end portions of the sheet for actuating said means whereby said sound producing devices are held against vibration during the return or rerolling of the sheet.

In testimony whereof I have hereunto signed my name in the presence of two subscribing witnesses.

HENRY KOCH.

Witnesses:
J. B. FURBER,
JULIUS H. LUTZ.